United States Patent Office
3,655,636
Patented Apr. 11, 1972

3,655,636
PROCESS FOR THE SYNTHESIS OF PEPTIDES USING 4-PYRIDYLMETHYL AND RELATED GROUPS FOR THE PROTECTION OF C-TERMINAL CARBOXYL GROUPS
Geoffrey Tyndale Young, Oxford, England, assignor to National Research Development Corporation, London, England
No Drawing. Filed Sept. 3, 1968, Ser. No. 757,119
Claims priority, application Great Britain, Sept. 4, 1967, 40,286/67; Apr. 10, 1968, 17,321/68
Int. Cl. C07c 103/52, 31/32, 31/34
U.S. Cl. 260—112.5          12 Claims

ABSTRACT OF THE DISCLOSURE

In peptide synthesis peptides are purified by transferring them from the phase in which they have been prepared to a second phase, separated from impurity which remains in the first phase, and transferred back to a liquid phase to give a solution of purified peptide for a further coupling step if necessary. The peptide may be purified by binding it to an ion exchanger in a solid second phase or by taking it into a liquid second phase by solvent extraction. This purification uses novel peptide esters in which the ester protecting a terminal carboxyl contains a basic group, the preferred protecting group being 4-pyridylmethyl, which is stable to hydrogen bromide in acetic acid and to trifluoroacetic acid but which may be removed by hydrogenation, or treatment with aqueous alkali or ammonia or hydrazine. Using the 4-pyridylmethyl protecting group, amino acids and peptides are coupled in homogeneous solution in the conventional manner and examples describe the preparation of di-, tri- and tetra-peptides in which the product is insolubilized on SE-Sephadex after each coupling, and of an octapeptide, 1-L-($\alpha$)-aspartic acid-5-L-valine antiotensin II, in which the product is purified by transfer to aqueous citric acid after each coupling.

---

The present invention relates to peptide synthesis and provides a new approach to the problem of purifying the peptide after the coupling reaction.

Peptide synthesis involves the repeated coupling together of an N-protected acylating reactant with an N-unprotected carboxyl-protected amino reactant to build up the desired peptide chain having the correct amino acid units present in the correct sequence. By improving the efficiency of the coupling methods it has proved possible to synthesize peptides containing 10 or 20, or even more, amino acid units in the chain and complex peptides such as bradykinin, oxytocin and insulin have now been synthesized. In order to recover a pure product in good yield at the end of such a multi-stage synthesis it is important to separate the desired peptide from the impurities, e.g. unreacted starting materials by-products etc., at frequent intervals and significant loss of product can occur during this purification. An important advance in peptide synthesis came in 1963 when Merrifield and his co-workers showed that an amino acid or peptide could be chemically bonded to a resin polymer through the carboxyl residue of the terminal amino acid and the stepwise addition of amino acids or peptides to the N-residue of the bonded amino acid or peptide could then be carried out without removing the bonded reactant from the resin. This solid phase method has the advantage that the product is rendered insoluble so long as it remains bonded to the resin and can thus be readily separated from the soluble impurities after each stage of the synthesis. A disadvantage of the procedure is that the product finally removed from the resin is not always homogeneous chiefly because of incomplete reaction due to the fact that one reactant is a polymer and mixtures obtained from the resin are often difficult to purify.

Various modifications of the Merrifield procedure have been proposed but all these solid phase methods suffer from the disadvantage that the peptide linkages are formed under heterogeneous reaction conditions since one reactant is always bonded to the resin and the normally acceptable methods are not always satisfactory. Further, it is not possible to examine and confirm the purity of the product at intermediate stages of the synthesis.

The present invention provides a process of purifying a peptide product obtained by a coupling reaction in a first phase which may be liquid or solid in which the peptide product is transferred to a second phase, separated from reactants, by-products and co-products which remain in the first phase, and the peptide product then transferred back to a liquid phase, free from the original reactants, by-products and co-products, to give a solution of purified peptide product.

The peptide product may be obtained by coupling together the reactants selected by whatever is the most convenient coupling method for those reactants, preferably by a standard procedure in homogeneous solution in the conventional manner, for example using an active ester, an azide or a mixed anhydride. The first phase is then liquid. According to established purification methods for peptide products obtained in this way, the peptide product remains in the solution in which it was prepared, while the impurities, excess or incompletely reacted reactants, co-products and by-products are removed from the solution by various methods. In complete contrast to this procedure, according to the present invention the peptide product is transferred to a second phase, which by definition is immiscible with the first phase. The impurities remain in the first phase so that when the two phases are separated, substantially complete purification of the peptide product occurs. The peptide product is then transferred back to a liquid phase which is preferably a solvent in which further coupling or other processing can be carried out. At this stage it can be examined to ensure that the previous coupling reaction has gone to completion and that the product is substantially homogeneous. If it is not, remedial action can be taken at that stage, e.g. to repeat or modify the conditions for the previous coupling reaction. The opportunity to examine the product and to take remedial action if necessary at this point in a synthesis represents a further advantage of the present invention.

The liquid phase to which the purified peptide product is transferred may be a further sample of the organic solvent used in the coupling reaction or, if desired, the original solvent can be used again after impurities have been removed, e.g. by distilling the solvent leaving the impurities as a residue. The liquid phase may however be a different solvent, from which the peptide product may be recovered e.g. by evaporation, or a different solvent in which the next coupling reaction may be effected. This last mentioned procedure is valuable in lengthy peptide synthesis when the solubility characteristics of the peptide change with increasing molecular weight.

The broad concept of purifying peptides by transferring the peptide product from a first phase to a second phase and back to a liquid phase may be put into effect by providing on the peptide molecule a reactive group which enables this transfer to take place readily, which does not interfere with the peptide synthesis itself and which can be readily removed at the end of the synthesis, preferably at the same time and using the same reagents used to remove the various protecting groups. The detailed requirements for this reactive group and specific groups meeting these requirements will be discussed below.

According to one embodiment of the present invention, the peptide product may be insolubilized and transferred to a solid second phase.

One particularly convenient way of insolubilizing the peptide is to adsorb it on to an ion exchanger. The exchanger to which the desired peptide is bound may then be readily separated from the solution which contains the impurities and the exchanger may be thoroughly washed to ensure complete removal of the soluble materials. The peptide can then be resolubilized merely by eluting the exchanger to give a solution of peptide which, after removal of the N-protecting group, is ready for coupling, if desired, in a further stage of the synthesis. When the next amino acid unit has been coupled in the chain, the peptide may be re-attached to the exchanger and again separated from the soluble impurities and then eluted for the next coupling step. This procedure may be repeated in an identical manner after each coupling step in a synthesis and enables the final product to be obtained by a simple experimental procedure in a good yield free from partial reaction products, even after a large number of coupling reactions.

The N-protecting group is preferably removed after the peptide is eluted from the exchanger so that the purified peptide may then be used directly in a further coupling step.

The peptide may be conveniently bound to the exchanger by providing in an ester group protecting a carboxyl group on the amino acid or peptide an ionizable group, for example a basic group, which will enable the amino acid or peptide to be attached ionically rather than covalently to a cation exchanger. The ester group containing the basic group must be one which will enable the amino acid to be readily bound to and eluted from the ion exchanger, it should not be an "active" ester group so far as the peptide coupling reaction is concerned and should not interfere during a coupling reaction in homogeneous solution. The ester forming group should be one with which the amino acid or peptide can be readily reacted at the beginning of a synthesis, it should be stable to all the reaction conditions customarily encountered during peptide synthesis and should be readily removable at the end of a synthesis by methods which will not damage the peptide product. In principle, there is no reason why the ionizable group should not be acidic and used with an exchanger containing basic groups but in view of the possibility that the acylating reactant may give rise to acidic by-products it is preferred to use a basic ionizable group.

The peptide may be removed from the exchanger by eluting the polymer with a basic liquid which is a stronger base than the weakly basic group on the peptide molecule or by means of acid. During the elution procedure, the eluting medium is in contact with the peptide molecule for a prolonged period of time and, since commonly used protecting groups are sensitive to acid it is preferable to use a basic medium for elution. However, the peptide may be susceptible to hydrolysis or other decomposition in the presence of a strong base, and therefore the eluting medium should not be too strongly basic. It is preferred to use an eluting base no stronger than triethylamine, and, accordingly, the basicity of the basic group on the peptide molecule should be less than that of triethylamine. There is a relationship between the basicity of the basic group on the peptide molecule, the basicity of the eluting liquid and the acidity of the acid groups on the polymer, and the relationship should be such that the peptide can be substantially completely bound to the exchanger but readily eluted using a basic liquid which will not cause decomposition of the peptide product. When the exchanger to be used contains strongly acidic groups and the peptide contains acid sensitive protecting groups, e.g. tert. butoxycarbonyl, it is important to use the sulfonated exchanger in the form of a salt to avoid premature removal of the protecting group. SE-Sephadex may be saturated with 3-bromopyridine for this purpose prior to its use in the process of the invention.

The esters of the invention may be adsorbed on to available cation exchangers and sulfated or sulfonated or carboxylated polysaccharides such as sulfoethyl Sephadex or sulfoethyl cellulose are particularly suitable.

A further way in which the peptide product may be transferred to a solid second phase is by insolubilization by complex formation. Again, complex formation can be achieved by providing in a protecting group on the peptide molecule a functional group that can participate in complex formation, e.g. by acting as a donor in complex formation with a metal. It is again preferred to provide this functional group in the ester grouping protecting the carboxyl group which will be removed in a final step of the synthesis along with all the other protecting groups.

According to a further embodiment of the invention, the peptide product may be purified by transfer to a liquid second phase. This transfer can again be achieved by providing in a protecting group on the peptide molecule, which is ultimately to be removed at the end of the synthesis, a functional group, again preferably a basic group, so that the peptide product can be transferred into an acidic aqueous second phase. In selecting the relative basicity of the basic group on the peptide molecule and the relatively acidity of the aqueous second phase, consideration must be given to the need to match the acidity and basicity to ensure substantially complete transfer of the peptide product from the first phase to the second phase, and the need to avoid undesired degradation of acid sensitive portions of the peptide molecule by the acidic second phase. In this embodiment also there is no reason why, in principle, the functional group on the peptide molecule should not be acidic and the liquid second phase basic, but, in view of the possibility that the acylating reactant may give rise to acidic by-products, it is preferred to use an acidic medium as second phase. Weak water-soluble organic acids have been found most satisfactory to provide the necessary acidity and the preferred liquid second phase is aqueous citric acid. Other organic acids, such as acetic, oxalic or glycollic acids, may also be used and in certain circumstances mineral acids, such as phosphoric or even hydrochloric acid, can be used. A buffered solution can be used if desired, controlling the pH in the weaker acid solutions.

In addition to matching the basicity and acidity of the functional group and the liquid second phase, consideration must be given to the partition of the peptide product between the two phases to ensure that substantially all the peptide product is transferred to the second phase.

By definition, when a liquid second phase is used the two liquids of the first phase and the second phase will be immiscible with each other and the peptide product is conveniently transferred by solvent extraction. In a lengthy peptide synthesis, where the molecular weight of the coupled peptide product is large, and it is desired to use aqueous acid for the second phase, it is often difficult to find a water immiscible organic solvent in which to conduct the coupling reaction, and in such circumstances it is necessary to use indirect methods to take up the peptide product into the aqueous acid. For example, the reaction mixture may be evaporated to dryness and the peptide product may be extracted from the residue into aqueous acid. Alternatively, the basic peptide product may be converted into a salt by the addition of acid, the solvent removed by evaporation, and the unchanged reactant, by-products, and co-products then extracted into an organic solvent, with or without the addition of water. In another case in which the coupling reaction has been carried out in a water-miscible solvent, the basic peptide product can be kept in solution by the addition of aqueous acid, which precipitates the non-basic unchanged reactant, by-products, and co-products.

The peptide product may be recovered from the liquid second phase by methods similar to those for its recovery from the solid polymeric second phase, that is to say a base, stronger than the basic group on the peptide product, is added to the liquid second phase to release the peptide product. The use of the liquid second phase has advantages over the use of the solid second phase when the peptide product contains groups which are particularly sensitive to base because the peptide product is in contact with the basic medium for a much shorter period than it is when it is eluted, from an exchanger for example. Because there is this shorter contact time, it is possible to use a base, e.g. aqueous sodium carbonate, stronger than that which would be acceptable in the elution of the peptide product from the polymer.

As indicated briefly, above, it is necessary to provide in the peptide molecule an ionizable group which enables the peptide to be transferred from phase to phase as required. It has been found most convenient to incorporate this ionizable group in the protecting group of a terminal carboxyl group and a novel series of esters of amino acids and peptides have been prepared in which a terminal carboxyl group is protected as an ester which meets all of the requirements discussed above.

A further feature of the invention provides esters of the general formula $$R.CO.OCR_1R_2R_3$$

where R represents the residue of an $\alpha$-amino or $\alpha$-imino acid RCOOH or of a peptide derived therefrom, $R_1$ represents a cyclic group of aromatic character containing a basic group in the ring or as a substituent in the ring, and $R_2$ and $R_3$ each represent a hydrogen atom or a lower alkyl group e.g. containing 1 or 2 carbon atoms. (The term "amino acid" used in this specification is to be understood to include "imino acids" also.) In general this ester group can be removed at the completion of the synthesis by the action of aqueous alkali to give the peptide acid, by ammonia to give the peptide amide or by hydrazine to give the peptide hydrazide, which may then be converted into the acid azide and hence joined to another peptide as desired.

If however a peptide acid (i.e. a peptide having a terminal free carboxyl group) is required it is usually necessary to avoid using alkali for removal of the protecting ester group and the protecting ester group can be removed from the novel esters of the invention under non-alkaline conditions. For example, if $R_1=R_2=H$, and $R_3=$4-dimethylaminomethylphenyl, the benzyl ester with the basic substitutent, can be converted into the corresponding acid by catalytic hydrogenation or by sodium in liquid ammonia or by the action of anhydrous hydrogen fluoride, thus avoiding the necessity of alkaline treatment.

In preferred compounds of the invention $R_3=R_2=H$ and $R_1$ is a heterocycle of aromatic character containing nitrogen in the ring.

When the heterocycle is pyridine, quinoline or isoquinoline the ester has a degree of basicity particularly suitable for use in the process of the invention.

Pyridyl-alkyl esters of amino acids and peptides have a basicity and other chemical reactivity which renders them particularly suitable for adsorbing to a cation exchanger to insolubilize the peptide obtained by coupling the ester at its N-residue and such ester groups can be easily removed as a final step in a peptide synthesis by catalytic hydrogenation, by electrolytic reduction, by hydrolysis or by treatment with hydrazine, ammonia or sodium in liquid ammonia depending on the nature of the peptide product.

The pyridyl-alkyl group is one in which the alkyl portion of the molecule contains 1 to 3 carbon atoms and substituted methyl groups, such as 4-pyridylmethyl (4-picolyl) are especially preferred. These picolyl esters are stable in the presence of hydrogen bromide in acetic acid and trifluoroacetic acid and as these reagents are customarily used to remove the N-protecting benzyloxycarbonyl and tert butyloxycarbonyl groups respectively used extensively in peptide synthesis, the N-protecting group can be removed by the usual method in peptide synthesis after each coupling step in which it is used.

In practice, it has been found that the picolyl ester group has the right combination of properties for use in the purification process of the invention, both in the solid second phase and liquid second phase embodiments. However, related substituted alkyl esters may also be used. The useful range of basicity is wide but if the solid second phase procedure of this invention is being used with a strongly acidic ion-exchanger then the preferred ester $R.CO.OCR_1R_2R_3$ will be such that the pKa of $HCR_1R_2R_3$ is in the range 4–8, the pKa value referring to the protonated base.

In peptide synthesis using the novel compounds and purification procedure of the invention, the novel compounds are frequently used for coupling in the form of the acid addition salt, particularly the hydrobromide, so that the basic group in the carboxyl protecting group, and of course the terminal amino group of the peptide is in the form of a salt. Such acid addition salts form a further useful embodiment of the invention.

In peptide synthesis using the novel compounds and purification method of the invention, a carboxyl group on the terminal amino acid is protected at the beginning of the synthesis with the basicly substituted alkyl group. When the amino component in the first coupling reaction is a single amino acid the novel ester of the invention will be a single amino acid having a protected carboxy group. The product of the coupling will be a further compound of the invention $R.COOCR_1R_2R_3$ where R represents the residue of a peptide R.COOH containing two or more amino acids. In such a product, the amino group on the terminal amino acid unit remote from the protected carboxyl group, will be protected, frequently as the N-benzyloxycarbonyl or N-tert. butyloxycarbonyl derivative and such N-protected derivatives of carboxyl protected amino acids and peptides form still further embodiments of the invention.

These N-protecting groups are removed, preferably after purification by the process of the invention, to give an N-unprotected carboxyl peptide which can be used as amino component in the next stage of the synthesis. After this second coupling reaction, a further novel ester of the invention in obtained in which the peptide chain is built up by one further stage and is ready for purification. This cycle of coupling, purifying the coupled peptide product by transferring it to a second phase and then back to another liquid phase using the functional group incorporated in the terminal carboxyl protecting group, and then removing the N-protecting group can be repeated as often as necessary. It is not necessary to remove the carboxyl protecting group at all during this repeated cycle until either the synthesis is complete or it is desired to use the peptide as an acylating component.

It is not, of course, essential that the carboxyl protecting group incorporating the functional group be introduced into a single amino acid, it can equally well be introduced into a peptide of two or more amino acid units either in the terminal carboxyl or in a side-chain carboxyl, where such peptides are to be used as original reactants in a synthesis.

The amino acids and peptides with which the present invention is mainly concerned at those $\alpha$-amino acids (including $\alpha$-imino acids) found in the hydrolysate of naturally occurring peptide and protein materials, such as glycine, L-alanine, L-leucine, L-valine, L-cysteine, L-glutamic acid, L-serine, L-methionine, L-arginine, L-asparagine, L-aspartic acid, L-histidine, L-iso-leucine, L-lysine, L-ornithine, L-proline, L-threonine, L-tryptophane, and L-tyrosine and peptides derived from such α-amino acids. The esters of the invention are generally useful in peptide synthesis, however, and unnatural amino acids may be incorporated equally well in peptide chains using the substituted alkyl esters of such acids.

The esters of the invention may be prepared by reacting the basicly substituted alkanol, or an esterifiable derivative thereof, e.g. the halide, with the amino acid or peptide acid or an esterifiable carboxylic group derivative thereof, e.g. the acid chloride, the amino acid being protected as necessary at the amino group.

Esters of the invention may be used for the purification of peptides regardless of the method of production of the peptide. It is not essential that the heterocyclic substituted alkyl ester group be present to protect the carboxyl group in the amino in every coupling reaction in the synthesis, and peptides prepared by any method not necessarily in homogeneous solution and perhaps even already partially purified, may be converted at a carboxyl group to an ester with a basicly substituted alkyl group of the type defined above at any stage in the synthesis, and the peptide then subjected to the purification process of the invention.

The following examples are given to illustrate the process of the invention. Temperatures are in ° C. The abbreviations given for amino acids and their protecting groups are those recommended by The International Union of Pure and Applied Chemistry in their Information Bulletin No. 25 (1966).

EXAMPLE 1

(a) Benzyloxycarbonyl-glycine picolyl ester (Z-Gly-OPic)

A solution of triethylamine (12.649 g.; 0.125 mole) in dimethylformamide (DMF) (100 ml. solution) was added to a mixture of benzyloxycarbonyl-glycine (15.691 g.; 0.075 mole) and 4-picolyl chloride hydrochloride (8.202 g.; 0.05 mole). The mixture was heated for 15 hours at 100°, cooled, filtered and the filtrate evaporated at 90–100° in vacuo. The residue was evaporated twice with ethyl acetate, taken into ethyl acetate and the deep-red-black mixture equilibrated with a little water to give two clear, deeply colored phases. Sodium bicarbonate solution was added and the ethyl acetate layer separated. The bicarbonate layer was twice extracted with ethyl acetate and the combined deep-red ethyl acetate extracts washed twice with sodium bicarbonate solution, twice with water, brine and dried over $MgSO_4$. The deep-red solution was treated with charcoal, filtered and the treatment repeated, to give an almost colorless solution which evaporated to a pale lime colored gum which crystallized easily on addition of a little ether. Yield: 10.22 g. (68.1% based on picolyl chloride).

The sodium bicarbonate extract and washings were acidified with 12 N.HCl and extracted into ethyl acetate. The colorless ethyl acetate extract was washed with water and brine. Evaporation of the dried solution yielded a white crystalline solid M.P. 119–120°, 7.15 g. (total Z-Gly-OH accounted for in product and by recovery 91%).

The product was taken into ether (~500 ml.) and the ether distilled off to about 50 ml. of solution. The solution was stood at room temperature and then refrigerated. A very pale cream crystalline solid separated and was filtered and washed with ether and petroleum spirit. Yield: 8.42 g. (56%); M.P. 71.5–73.5°.

(b) Removal of benzyloxycarbonyl group

Z-Gly-OPic (90 mg.; 0.3 mole) was treated with HBr/AcOH (45% w./v. 0.5 ml.; ~9 equiv.) for 1 hour at room temperature. A solid began to separate from the solution after about 5 min. An excess of ether was added and the product filtered and washed liberally with ether to give a cream solid: 96 mg. (97.5%). Thin layer chromatography (TLC) indicated complete Z group removal and no OPic group removal.

(c) Removal of picolyl group and benzyloxycarbonyl group

Z-Gly-OPic (90 mg.; 0.3 mole) was catalytically hydrogenated in 50% aq. EtOH (10 ml.) with 10% Pd/C (20 mg.) for 4 hours. The mixture was filtered, evaporated and the residue triturated with ethanol to give a white solid.

TLC indicated the presence of glycine only in the solid.

(d) Uptake of 4-picolyl ester on to ion-exchange polymer and their recovery

Z-Gly-OPic (0.5 g.; 1.66 mole) was dissolved in 50% aqueous dioxan (1.5 ml.) and Sephadex SE-C.25 (H form) polymer added portionwise over 65 minutes. TLC indicated gradual disappearance of the ester, complete disappearance being obtained after addition of 5.1 g. of polymer.

The mixture was filtered, washed with 50% aqueous dioxan (85 ml.), 90% aqueous dioxan (100 ml.).

The polymer was then eluted with $Et_3N$:dioxan:$H_2O$ (1:90:9) (100 ml.) under gravity to give a colorless eluate which was evaporated to a clear gum containing a small brown patch: 0.49 g. (98% recovery). The gum was taken into ethyl acetate and a little charcoal added (color change from yellow brown to pale yellow). TLC indicated only Z-Gly-OPic and no low running contaminants. Evaporation and trituration with ether gave crystalline Z-Gly-OPic.

Elution of the polymer with a further 100 ml. of eluant gave about 10 mg. of residue.

EXAMPLE 2

Synthesis of Leu-Ala-Gly-Val without isolation of intermediates (i) A solution of triethylamine (5.0595 g.; 50 mmole) in DMF (50 ml. of solution) was added to a mixture of benzyloxycarbonyl L-valine (7.54 g.; 20 mmole) and 4-picolyl chloride hydrochloride (3.28 g.; 20 mmole) and the mixture was heated for 17½ hours at 100°, cooled, filtered and the filtrate evaporated at 90–100°. The residue was worked up as described in Example 1. Recovered: Z-Val-OH: 3.37 g.

The dark-yellow-brown product extract gave a yellow solution after charcoal treatment. It was evaporated to a yellow oil which solidified on trituration with ether/petrol. Crude yield: 5.7 g. (83.2% based on picolyl chloride).

The product was taken into ether, filtered from a little insoluble material and evaporated to about 20 ml. Petrol was added until the solution began to cloud and on standing the product separated as a cream solid. Recrystallization from ether (overnight) gave long, almost colorless needles which were filtered, washed with a little cold ether and petrol. Yield 2.87 g. (41.9%); M.P. 63–65°. Addition of petrol to the filtrate gave a second crop of crystalline cream powder, 0.86 g. (12.6%) M.P. 61.5–63.5°.

Combined yield: 54.5% (total Z-Val-OH accounted for in product and by recovery 81%).

(ii) Removal of benzyloxycarbonyl group by HBr/AcOH: Benzyloxycarbonyl-L-valinepicolyl ester (1.712 g.; 5 mmole) was dissolved in glacial acetic acid (2 ml.) and HBr/AcOH (45% w./v., 10 ml., 11 equiv.) added. After 5–10 minutes the product began to separate. After 1 hour at room temperature excess ether (500 ml.) was added and the mixture filtered. After lavish washing with ether the cream precipitate was dried for 1 hour over KOH/silica gel.

The product was recrystallized as the hydrobromide from water/acetone as short needles, 1.6 g. (86.5%) M.P. 196.5–198° yellow to brown and finally becoming mobile at 240–245°.

(iii) Z-Gly-Val-OPic: A solution of triethylamine (0.3036 g.; 3 mmole) in dioxan (5 ml. of solution) was added to a magnetically-stirred suspension of L-valine 4-picolyl ester dihydrobromide (0.5552 g.; 1.5 mmole) in dioxan (5 ml.).

After 15 minutes at room temperature, benzyloxycarbonylglycine p-nitrophenyl ester (1.982 g.; 6 mmole) was added and the mixture stirred for 48 hours. (After 24 hours TLC indicated the reaction to be complete.) The mixture was filtered and the white crystalline precipitate washed with dioxan (yield 0.48 g. (90%) Et₃NHBr). The filtrate was diluted with one volume of water and sufficient ethyl acetate added to take up the precipitated oil as an upper layer. The mixture was refrigerated for 15 minutes and Sephadex SE–C.25 resin (chiled, 4×7 g.) added over 15 minutes with shaking. The mixture was refrigerated for 45 minutes (pH ~3.6), filtered and the resin washed with doxan:water:ethyl acetate (50:50:20) (2× 120 ml.); dioxan:water:ethyl acetate (80:20:10) (1× 110 ml.) and dioxane (3× 100 ml.). (Addition of sodium bicarbonate solution to the final wash gave no yellow coloration.)

The resin was next eluted with chilled dioxan:water: triethylamine (90:9:2) (2× 100 ml.) to give colorless eluates which were evaporated, separately, at below 30°. The residue in each case was taken into ethyl acetate and the solution dried over magnesium sulfate; TLC indicated one spot in each case Rf(MeOH) 0.75 (Ninhydrin negative, chlorine/starch-iodide positive). (Elution with a third portion of solvent yielded only negligible residue on evaporation.)

The two fractions were filtered, combined and evaporated to a clear gum; 0.620 g. (103.5%).

(iv) 2HBr.HGly-Val-OPic: Z-Gly-Val-OPic (gum from above) was dissolved in acetic acid (2 ml.) and hydrogen bromide in acetic acid (6.5 N; 2.5 ml., 16 mmole) added at room temperature. Bubbles of gas were given off and after 45 minutes ether (100 ml.) was added to the clear solution and the mixture refrigerated for 1 hour. The sticky white solid was filtered, washed well with ether and desiccated for 20 minutes. The gum was reprecipitated from ethanol/ether as a white solid which was filtered, washed well with ether and dried overnight, in vacuo, over CaCl₂/KOH. Yield: 0.524 g. (81% based on 2HBr.HVal.OPic) of a hygroscopic but easily transferable solid.

(v) Z-Ala-Gly-Val-OPic: A solution of triethylamine (0.3036 g.; 3 mmole) in dioxan (5 ml. of solution) was added to a magnetically-stirred suspension of 2HBr.H-Gly-Val-OPic (0.524 g.; ~1.2 mmole) in dioxan (5 ml.). (The excess triethylamine was added in case the product should be still contaminated with some excess hydrogen bromide.)

After 10 minutes at room temperature freshly made N-carbobenzoxy-L-alanine p-nitrophenyl ester (Z-Ala-ONP) M.P. 77–78°; $(\alpha)_D$ −41.6° (c. 2.00 in DMF) (2.066 g.; 6 mmole) was added and the mixture stirred for 43 hours. The mixture was filtered and the filtrate diluted with one volume of water an dsufficient ethyl acetate added to take-up the precipitated oil as an upper layer. After refrigeration, chilled Sephadex SE–C.25 resin was added to the yellow mixture in 6 portions over 45 minutes (56 g. in all). The yellow color disappeared after the addition of the first 10 g. of resin but the amount described was needed before a reaction was attained to Congo red paper. After refrigeration for 105 minutes the mixture was filtered and the resin washed with dioxan:water:ethyl acetate (50:50:20) (2× 120 ml.); dioxane:water:ethyl acetate (80:20:10) (1× 110 ml.) and dioxan (4× 100 ml.).

The resin was next eluted with chilled dioxan:water: triethylamine (90:9:2) (3× 100 ml.) and the eluates evaporated, separately, at below 30° under high vacuum (2 mm.→0.5 mm.) to give colorless gums which were taken into ethyl acetate and dried over magnesium sulfate. The solutions were filtered, combined and evaporated to a clear gum which was desiccated under high vacuum overnight. Yield: 0.621 g. (88%, based on 2HBr.HAla-Gly-Val-OPic).

(vi) 2HBr.HAla-Gly-Val-OPic: Z-Ala-Gly-Val-OPic (0.621 g.; gum from above) was dissolved in acetic acid (2 ml.) and 6.5 N HBr/AcOH (2.5 ml.; 16 mmole) added at room temperature. After 50 minutes ether was added to the clear solution to give a gummy precipitate. The mixture was evaporated and the residue triturated three times with ether, taken into ethanol and precipitated with ether. The hygroscopic white solid was filtered, washed lavishly with ether and desiccated overnight over CaCl₂/KOH, in vacuo. Yield: 0.515 g. (69% based on 2HBr.H-Val-OPic).

(vii) Z-Leu-Ala-Gly-Val-OPic: A solution of triethylamine (0.249 g.; 2.4 mmole) in dioxan (4 ml. of solution) was added to magnetically-stirred suspension of 2HBr.H-Ala-Gly-Val-OPic (0.511 g.) in 5 ml. dioxan. After 10 minutes at room temperature freshly recrystallised N-carbobenzoxy-L-leucine p-nitrophenyl ester (Z-Leu-ONP) (M.P. 94°; $(\alpha)_D^{20}$ −33.5° (c. 1.988 in DMF) Lit M.P. 95°; $(\alpha)_D^{20}$ −33.5° (c. 2 in DMF) (2.319 g.; 6 mmole) was added and the mixture stirred for 48 hours. The mixture was filtered, the filtrate diluted with one volume of water and sufficient ethyl acetate added to take up the precipitated oil as an upper layer. After refrigeration resin was added in the usual way to the yellow mixture (50 g. in all over ½ hour).

The colorless mixture was filtered and the resin washed with dioxan:water:ethyl acetate (50:50:20) (2× 120 ml.) (only very faint yellow color on addition of sodium bicarbonate to last 50 ml. of eluate) dioxane:water: ethyl acetate (80:20:10) (1× 110 ml.) and dioxan (3× 100 ml.).

The resin was next eluted with chilled dioxan:water: triethylamine (90:9:2) (4× 100 ml.) and the eluates evaporated, separately, below 30° under high vacuum (2 mm.→0.5 mm.). The residues, pinkish in color, were combined, taken into ethylacetate, dried over magnesium sulfate, treated with a little charcoal and filered to give an almost colorless solution (input 5% methanol/chloroform TLC) (Nin, negative/Cl₂ positive). Evaporation gave an almost colorless foam 0.520 g. (60%) (based on 2HBr.H-Val-OPic).

(viii) H.Leu-Ala-Gly-Val-OH: A solution of Z-Leu-Ala-Gly-Val-OPic (520 mg.) in AcOH (16 ml.) and water (4 ml.) was catalytically hydrogenated with 10% Pd/C catalyst (50 mg.) for 46 hours at room temperature and atmospheric pressure.

The mixture was filtered on a Celite pad and the catalyst washed with 80% acetic acid. The filtrate and washings were evaporated (35–40°) to a thin colorless oil smelling of acetic acid. The residue was taken into ethanol, filtered from dust, etc., and excess ether added to give approximately 0.3 g. of a white solid which was filtered and washed well with ether.

The hygroscopic solid tetrapeptide was rapidly transferred to a desiccator and dried overnight in vacuo over silica gel.

EXAMPLE 3

4-picolyl ester of benzyloxy carbonyl-L-valine (Z-L-Val-OPic)

4-picolyl chloride (20 mmoles), benzyloxycarbonyl-L-valine (20 mmoles), and tetramethylguanidine (40 mmoles) are dissolved in dimethyl formamide (DMF) (ca. 50 ml.) and heated on a boiling water bath until no 4-picolyl chloride remains (usually about 3 hours). This time is determined by thin-layer chromatography of the reaction mixture, using chloroform-methanol (95–5) as solvent, and chlorine-o-tolidine-potassium iodide for detection. The tetramethylguanidium chloride is filtered off and the filtrate is evaporated to dryness 90°/1 mm. Eethyl acetate (EtOAc) is added to the residue and then evaporated; this is repeated and the red residue is distributed between ethyl acetate and a small volume of water. Sodium bicarbonate solution is then added, and the ethyl acetate layer separated and washed twice more with aqueous sodium bicarbonate and with water (twice) and finally with brine. The organic layer is dried (MgSO$_4$)

and taken to dryness. The yield of crude brown product is ca. 85%. The addition of charcoal during recrystallization usually removes the color; yields after recrystallization are 60–65%.

Z-L-Val-OPic: M.P. 65–66° (from ether), $(\alpha)_D^{20}$ —12.1° (c. 1 DMF)

The following esters are similarly prepared using Z-L-phenylalanine, L-L-alanine and Z-L-ω-nitroarginine in place of Z-L-valine.

Z-L-Phe-OPic. M.P. 87.5–89.5° (EtOAc) $(\alpha)_D^{20}$—12.1° (c. 1 in AcOH); $(\alpha)_D^{20}$—33° (c. 1, DMF)
Z-L-Ala-OPic: M.P. 111–112.5° (from ether), $(\alpha)_D^{20}$ —20.2° (c. 1, DMF)
Z-L-ω-Arg (NO$_2$)OPic: M.P. 151–153° (from MeOH); $(\alpha)_D^{20}$—13.1° (c. 1 DMF)

The following esters are prepared using the procedure described in Example 1 paragraph (a) using Z-L-isoleucine, Z-L-leucine, Z-L-proline, Z-S-benzyl-L-cysteine and Z-L-methionine in place of Z-L-valine.

Z-L-Ile-OPic—M.P. 50.5–52.0° $(\alpha)_D^{20}$ —10.3° (c.=1%, DMF)
Z-L-Leu-OPic—a mobile oil, $(\alpha)_D^{20}$ —12.1° (c.=2.04%, EtOAc)
Z-L-Pro-OPic—a pale yellow oil
Z-(Bzl)-L-Cys-OPic—an orange oil, TLC pure in a 3 solvent system
Z-L-Met-OPic—a pale yellow oil, TLC pure.

The N-protecting group is removed from these esters by treating 0.3 mole of ester with hydrogen bromide in acetic acid (45%) for 1 hour at room temperature. The product is precipitated by ether and washed liberally with ether; the crude salt is commonly hygroscopic and washing is best carried out by decantation. Reprecipitation from ethanol by ether usually gives a stable white crystalline dihydrobromide of the aminoacid 4-picolyl ester (ca. 85% yield).

L-Val-OPic.2HBr: Recrystallization from aqueous acetone gave needles of M.P. 197.5–199°, $(\alpha)_D^{20}$ +1.7° (c. 1 in H$_2$O)
L-Phe.OPic.2HBr: Colorless prisms from EtOH, M.P. 182–185° (decomp.) $(\alpha)_D^{20}$ —11.1° (c. 2 in H$_2$O)
L-Arg(NO)$_2$OPic.2HBr: Recrystallized from aqueous acetone, M.P. 170–175° (decomp.), $(\alpha)_D^{20}$ —2.6° (c. 1.07 in H$_2$O)
L-Leu-OPic.2HBr: M.P. 165–167° (decomp.), $(\alpha)_D^{20}$ —2.5° (c.=1.98, H$_2$O)
L-Pro-OPic.2HBr: Hygroscopic solid, $(\alpha)_D^{20}$ —5.5° (c.=1.3, H$_2$O).

EXAMPLE 4

Z-L-Pro-L-Leu-Gly.NH$_2$

The 4-picolyl ester of glycine, prepared as described in Example 1, paragraphs (a) and (b), is used in the synthesis of the tripeptide according to the general experimental procedure described in Example 2. 1.5 mmoles Gly-OPic2HBr is coupled with 3.0 mmoles Z-L-Leu-OPCP (pentachlorophenyl ester of Z-L-Leu) in tetrahydrofuran in the presence of 3 mmoles triethylamine. After 24 hours, the dipeptide is filtered from triethylamine hydrobromide (NEt$_3$.HBr), absorbed on to the resin, the resin washed with tetrahydrofuran (THF) and eluted with a mixture of dimethylformamide, water and triethylamine (DMF-H$_2$O-NEt$_3$) (volume ratio: 90.8:2), to give the N-protected dipeptide.

The N-protecting group is removed by treatment with 45% w./v. hydrogen bromide in acetic acid (HBr-AcOH)

for 2 hours to give L-Leu-Gly-OPic.2HBr (TLC gives one spot). The N-protected dipeptide is coupled as before with Z-L-Pro-OPCP to give the protected tripeptide, Z-L-Pro-L-Leu-Gly-OPic which is absorbed on to the resin, washed and eluted as described above and the picolyl ester group finally removed by treatment with ammonia in methanol for 26 hours, to give Z-L-Pro-L-Leu-Gly-NH$_2$ in a 52% overall yield. M.P. 162–164° C. $(\alpha)_D^{20}$ —71° (c. 1.85 in 95% ethanol).

EXAMPLE 5

Z-L-Ser-L-Pro-L-Phe-OPic

L-Phe-OPic.2HBr, prepared as described in Example 3 is used in the synthesis of the tripeptide according to the general procedure described in Example 2. 14 mmoles L-Phe-OPic.2HBr is coupled with 43 mmoles Z-L-Pro-OPCP in dioxane in the presence of 42 mmoles NEt$_3$ and 14 mmoles AcOH. The dipeptide is filtered free from NEt$_3$HBr absorbed on to the resin, the resin washed with dioxane/water (volume ratio 90:10) and eluted with trimethylamine, water/dioxane (volume ratio 2:19:40) to give the protected dipeptide, Z-L-Pro-L-Phe-OPic.

The protecting Z group is removed by treatment with 45% HBr/AcOH and the resulting dipeptide dibromide passed over a Dowex-3 resin in the acetate form to convert the dipeptide dibromide to dipeptide diacetate. The diacetate is taken up in DMF and coupled with Z-L-Ser-OTCP (2,4,5-trichlorophenyl ester) as described above, to give the tripeptide which is absorbed on to the resin, the resin washed with DMF/H$_2$O (97:3) and then eluted with NEt$_3$/H$_2$O/DMF (2:3:95), the solution evaporated, the residue taken up in chloroform, washed with citric acid and evaporated to give Z-L-Ser-L-Pro-L-Phe-OPic in 55% overall yield. (TLC indicates one spot.)

EXAMPLE 6

Boc-L-Ala-Gly-OPic 1.33 mmoles Gly-OPic.2HBr and 4.0 mmoles

Boc-L-Ala-OTCP are coupled together in dioxane in the presence of 4 mmoles NEt$_3$ and 1.4 mmoles AcOH to give the dipeptide, which is filtered free from NEt$_3$.HBr and absorbed on to the resin, which has previously been saturated with 3-bromopyridine. The resin is washed with THF at 0° C. and eluted with NEt$_3$/H$_2$O/THF (20:8:90) and the solution evaporated, triturated with ether to give the protected peptide, Boc-L-Ala-Gly-OPic in quantitative yield which is shown to be pure by TLC and NMR techniques.

The protected dipeptide, Boc-L-Pro-L-Phe-OPic, is similarly prepared in quantitative yield to give a product indicated pure by TLC and the Boc protecting group is removed by treatment with trifluoroacetic acid to give the dipeptide, L-Pro-L-Phe-OPic.2CF$_3$COOH in 82% overall yield, indicated pure by TLC and NMR.

EXAMPLE 7

Synthesis of 1-L-(α)-aspartic acid-5-L-valine angiotensin II by a stepwise procedure from the C-terminal 4-picolyl ester The following reaction scheme is used:

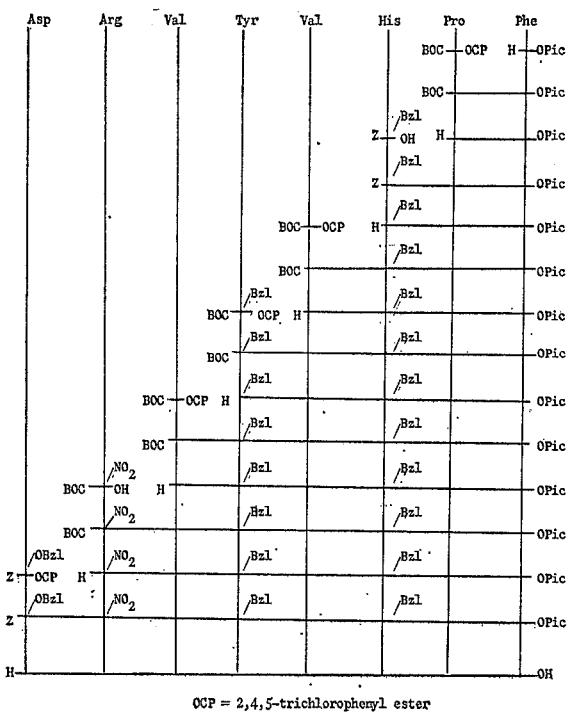

OCP = 2,4,5-trichlorophenyl ester (a) N-t-butoxycarbonyl-L - prolyl-L-phenylalanine 4-picolyl ester: Trimethylamine (d. 0.66, 2.0 ml.) was added to a stirred suspension of L-phenylalanine 4-picolyl ester dihydrobromide (2.090 g., 5 mmole) in ethyl acetate (15 ml.) and after 0.5 hour excess trimethylamine was removed on a rotary evaporator at 18–20°. N-t-butoxycarbonyl-L-proline 2,4,5-trichlorophenyl ester (2.368 g., 6 mmole) was added and the reaction mixture was stirred at 20–22° for 5 days after which thin layer chromatography (TLC) indicated complete disappearance of the amino-component, traces of which had been revealed after 1, 2 and 3 days. Water (20 ml.) was added to the reaction mixture and the ethyl acetate layer, diluted to 30 ml., was removed and washed with water (2× 20 ml.), 0.1 n-sodium hydroxide (3× 20 ml.) and brine (2× 10 ml.). The organic layer was extracted with chilled 2 N-citric acid (3× 15 ml.) which was immediately neutralised by adding to N-sodium bicarbonate (90 ml.). The liberated N-t-butoxycarbonyl-L-prolyl-L-phenylalanine 4-picolyl ester was taken up into ethyl acetate (4× 15 ml.), dried (MgSO$_4$) and the solvent removed under reduced pressure at 20° to give a white solid foam (2.095 g., 92.5%) which was chromatographically pure: M.P. 102–103° $(\alpha)_D^{20}$ —46.1° (c. 1.03 in ethanol).

(b) L-prolyl-L-phenylalanine 4-picolyl ester bis-trifluoroacetate: The protected dipeptide ester (2.00 g.) was dissolved in trifluoroacetic acid (7.0 ml.) and after 1 hour at 20–22° excess acid was removed on a rotary evaporator at 25° 1 mm., final traces being removed by repeated evaporation with water. The residue was taken up in ethanol (5 ml.) and ether (100 ml.) was added. The mother-liquor was decanted from the oily product which was finally obtained as a solid white foam (2.54 g., 99.2%) on prolonged rotary evaporation at 20°/0.1– 0.2 mm. The dipeptide ester trifluoroacetate was chromatographically pure.

(c) $N^\alpha$-benzyloxycarbonyl-$N^{im}$ - L-histidyl-L-prolyl-L-phenylalanine 4-picolyl ester: N,N'-dicyclohexylcarbodiimide (0.856 g., 4.15 mmole) was added to a stirred suspension of $N^\alpha$-benzyloxycarbonyl - $N^{im}$-benzyl-L-histidine (1.574 g., 4.15 mmole) in a solution of L-prolyl-L-phenylalanine 4-picolyl ester bis-trifluoroacetate (2.303 g., 3.96 mmole) and triethylamine (d. 0.727, 1.12 ml., 8 mmole) in dry N,N-dimethylformamide (40 ml.). The reaction mixture was stirred at 20° for 20 hours after which it was filtered and the solvent was removed from the filtrate at 25°/0.1 mm. Ethyl acetate (50 ml.) was added to the residue and after standing at 0° for 1 hour a white precipitate was filtered off. The filtrate was washed with water (2× 15 ml.), N-sodium bicarbonate (2× 15 ml.) and brine (2× 10 ml.) then extracted with 2 N-citric acid (3× 15 ml.) which, after washing once with ethyl acetate was neutralised by adding to N-sodium bicarbonate (90 ml.). The liberated protected tripeptide ester was taken up into ethyl acetate, dried (MgSO$_4$) and the solvent was removed under reduced pressure at 20–25° to give, after drying over calcium chloride in vacuo for three days, a solid foam (2.296 g., 81.1%). $(\alpha)_D^{20}$ —44.7° (c. 1.05 in ethanol).

(d) $N^{im}$-benzyl-L-histidyl-L - prolyl-L-phenylalanine 4-picolyl ester trihydrobromide dihydrate: The protected tripeptide ester (1.50 g.) was reacted during 1 hour with 3 N-hydrogen bromide in acetic acid (10 ml.) and the product was precipitated on the addition of ether (70 ml.). The precipitate was washed with ether and crystallized from ethanol as colorless prisms which after drying over calcium chloride and potassium hydroxide for 4 days in vacuo had M.P. 171–173° $(\alpha)_D^{20}$ —40.2° (c. 0.95 in water). Yield of purified product 1.60 g., 88.7%.

(e) N-t-butoxycarbonyl - L - valyl-$N^{im}$-benzyl - L - histidyl-L-prolyl-L-phenylalanine 4-picolylester: $N^{im}$-benzyl-L-histidyl-L-prolyl-L-phenylalanine 4-picolyl ester trihydrobromide dihydrate was coupled with N-t-butoxycarbonyl-L-valine 2,4,5-trichlorophenyl ester by the general procedure described in paragraph (a) and the tetrapeptide purified by transfer to aqueous citric and back to ethyl acetate as described in paragraph (a). The protected tetrapeptide ester was obtained as a chromatographically pure solid foam (0.770 g., 98.7%) after drying over calcium chloride in vacuo.

(f) L-valyl-$N^{im}$-benzyl - L - histidyl-L-prolyl-L-phenylalanine 4-picolyl ester tris-trifluoroacetate: The N-protecting group was removed from the protected tetrapeptide ester (0.740 g.) with trifluoroacetic acid by the general procedure described in paragraph (b) to give a hygroscopic solid (0.949 g., 97.9%). $(\alpha)_D^{20}$ —37.5° (c. 0.94 in water).

(g) N-t-butoxycarbonyl-O-benzyl - L - tyrosyl-L-valyl-$N^{im}$-benzyl-L-histidyl-L-prolyl-L-phenylalanine 4 - picolyl ester: L-valyl-$N^{im}$-benzyl-L-histidyl-L-prolyl - L - phenylalanine 4-picolyl ester tris-trifluoroacetate was coupled with O-benzyl-N-t-butoxycarbonyl - L - tyrosine 2,4,5-trichlorophenyl ester by the general procedure described in paragraph (a) and the organic layer was then extracted with chilled 2 N-citric acid (3× 10 ml.) which was immediately neutralized by adding to N-sodium bicarbonate (60 ml.). The liberated protected pentapeptide ester was taken up into ethyl acetate (4× 15 ml.), dried (MgSO$_4$), and after driving off the solvent under reduced pressure at 20° was obtained as a white solid (0.738 g., 89.2%) on triturating the residual foam with ether, M.P. 89–92°. Attempted purification on 3-bromo-pyridinium sulfoethyl Sephadex–C.25 produced no chromatographic improvement.

(h) O-benzyl-L-tyrosyl - L - valyl-$N^{im}$-benzyl - L - histidyl-L-prolyl-L-phenylalanine 4-picolyl ester tris-trifluoroacetate was obtained as a white solid, M.P. 110–112° (0.557 g., 90.5%) when the protected pentapeptide ester (0.500 g.) was treated with trifluoroacetic acid (4 ml.) and worked up as described in paragraph (b).

(i) N-t-butoxycarbonyl-L-valyl-O-benzyl - L - tyrosyl-L-valyl-$N^{im}$-benzyl-L-histidyl-L-prolyl - L - phenylalanine 4-picolyl ester: O-benzyl-L-tyrosyl-L-valyl-$N^{im}$-benzyl-L-histidyl-L-prolyl-L-phenylalanine 4-picolyl ester tris-trifluoroacetate was coupled with N-t-butoxycarbonyl-L-valine 2,4,5-trichlorophenyl ester by the general procedure described in paragraph (a) and the organic solution then extracted with chilled 2 N-citric acid (3× 10 ml.). On adding the acid solution to N-sodium bicarbonate (60 ml.) the protected hexapeptide ester (0.423 g., 95.2%) was precipitated as a white solid, M.P. 127–130° and was filtered off, washed with water, and dried over calcium chloride in vacuo.

(j) L-valyl-O-benzyl-L-tyrosyl - L - valyl-N$^{im}$-benzyl-L-histidyl-L-prolyl-L-phenylalanine 4-picolyl ester tris-trifluoroacetate was obtained as a white solid (0.476 g., 97.0%) when the protected hexapeptide ester (0.405 g.) was treated with trifluoroacetic acid (3 ml.) by the general procedure described in paragraph (b).

(k) N-t-butoxycarbonyl - L - nitroarginyl - L - valyl-O-benzyl-L-tyrosyl-L-valyl-N$^{im}$-benzyl-L-histidyl - L - prolyl-L-phenylalanine 4-picolyl ester: L-valyl - O - benzyl-L-tyrosyl-L-valyl-N$^{im}$-benzyl-L-histidyl-L-prolyl - L - phenylalanine 4-picolyl ester tris-trifluoroacetate (0.408 g., 0.297 mmole) in ethyl acetate (5 ml.) was stirred for 0.5 hour at 20° then the solvent and excess trimethylamine were removed on a rotary evaporator. Ethyl acetate (4 ml.) and N,N-dimethylformamide (1 ml.) were added, followed by N-t-butoxycarbonyl-L-nitroarginine (0.284 g., 0.89 mmole) and N,N'-dicyclohexylcarbodiimide (0.184 g., 0.89 mmole) and the reaction mixture was stirred for 5 hours after which time TLC indicated complete disappearance of the amino-component. After 18 hours water (2 ml.) was added and N,N'-dicyclohexyl urea was filtered off. The filtrate was diluted with ethyl acetate to 25 ml. and washed with water (3× 10 ml.), N-sodium bicarbonate (3× 10 ml.) and brine (2× 10 ml.) then more urea was filtered off. The ethyl acetate solution was extracted with chilled 2 N-citric acid (3× 10 ml.) which was added to N-sodium bicarbonate (60 ml.) thus precipitating the protected heptapeptide ester (0.334 g., 84.5%) as a white solid.

(l) L-nitroarginyl-L-valyl - O - benzyl - L - tyrosyl-L-valyl-N$^{im}$-benzyl-L-histidyl-L-prolyl - L - phenylalanine 4-picolyl ester tris-trifluoroacetate was obtained as a white solid (0.340 g., 86.5%) when the protected heptapeptide ester (0.333 g.) was treated with trifluoroacetic acid (2 ml.) by the general procedure described in paragraph (b).

(m) N-benzyloxycarbonyl-β-benzyl - L - aspartyl-L-nitroarginyl-L-valyl-O-benzyl-L-tyrosyl - L - valyl-N$^{im}$-benzyl-L-histidyl-L-prolyl - L - phenylalanine 4-picolyl ester: Trimethylamine (d. 0.66, 0.12 ml.) and L-nitroarginyl-L-valyl-O-benzyl-L-tyrosyl-L-valyl-N$^{im}$-benzyl - L - histidyl-L-prolyl-L-phenylalanine 4-picolyl ester tris-trifluoroacetate was coupled with N-benzyloxycarbonyl-β-benzyl-α-2,4,5-trichlorophenyl-L-aspartate in ethyl acetate/N,N-dimethylformamide by the general procedure described in paragraph (a) and the organic solution extracted with 3 N-citric acid (3× 15 ml.) when a gel formed on neutralizing the acid gel with N-sodium bicarbonate (135 ml.). The protected octapeptide ester was obtained as a gum, dissolved in hot ethanol (5 ml.) and filtered to produce, on cooling, a white solid (0.228 g., 67.4%), M.P. 141°.

1-L-α-aspartic acid 5-L-valine angiotensin II: The fully protected octapeptide ester (163 mg.) was hydrogenated during 66 hours in 80% acetic acid (3 ml.) in the presence of palladium on charcoal (10% Pd, 330 mg.). The reaction mixture was filtered through Celite and the solvent was removed from the filtrate at 25°/0.1–0.2 mm. The residual white solid was triturated with ethanol and the crude product showed three spots when chromatographed on Whatman No. 1 paper in the solvent systems A. sec:butanol-3% ammonia (120:44) and B,t-amylalcohol-triethylamine - diethylbarbituric acid-water-iso-propanol (100 ml.:0.8 ml.:1.8 g.:50 ml.:40 ml.) and was unresolved in C, sec:butanol-iso-propanol-water-pH 8 phosphate buffer (35:35:25:10); all spots being positive to Ninhydrin and the Pauly test. Simple extraction of the crude solid with cold water and removal of the water on a rotary evaporator gave L-aspartyl-L-arginyl-L-valyl-L-tyrosyl-L-valyl-L-histidyl-L-prolyl-L-phenylalanine acetate pentahydrate after drying over phosphorus pentoxide in vacuo. (Found (percent): C, 51.71; H, 7.05; N, 15.05.

Calculated for $C_{49}H_{69}O_{12}N_{13} \cdot CH_3COOH \cdot 5H_2O$ (percent): C, 51.81; H, 7.08; N, 15.42.) This showed essentially one spot in all three solvent systems. Amino-acid analysis, performed on the unpurified product of a preliminary small-scale hydrogenolysis gave Asp, 1.03; Arg, 1.05; Val, 2.05; Tyr, 0.5; His, 1.00; Pro, 1.01; Phe, 0.91. A bioassay on this synthetic product indicated an angiotensin activity of 83±10% of the international standard.

I claim:

1. In a process for the production of a peptide, having all protectable groups requiring protection protected, wherein the peptide is formed by coupling in homogeneous solution in a neutral liquid phase an N-unprotected amino-acid or peptide having a protected terminal carboxyl group and an N-protected amino-acid or peptide having a carboxyl group which will react with the unprotected amino group of the N-unprotected amino-acid or peptide to form an amide link, the improvement wherein the terminal carboxyl group of the N-unprotected amino-acid or peptide is protected as an ester of formula —$COOCH_2R_1$ where $R_1$ represents a pyridyl, quinolyl or isoquinolyl radical.

2. A process according to claim 1, in which the ester group is a 4-pyridylmethyl group.

3. A process for the production of a peptide having all protectable groups requiring protection protected which comprises the steps of:
  (a) forming a first peptide by coupling in homogeneous solution in a neutral liquid phase an N-unprotected amino-acid or peptide having a terminal carboxyl group protected as an ester of formula COOR where R represents a 4-pyridylmethyl group, and an N-protected amino-acid or peptide having a carboxyl group which will react with the unprotected amino group of the N-unprotected amino-acid or peptide to form an amide link,
  (b) substantially completely binding said first peptide in the neutral liquid phase to a cation exchange resin having acidic groups such that the said peptide can be substantially completely bound to the resin but readily eluted using a basic liquid which will not cause decomposition of the said peptide,
  (c) separating the cation exchange resin carrying the bound first peptide from the neutral liquid phase,
  (d) recovering the first peptide from the cation exchange resin by treatment with an eluant in which the said peptide is stable and which has sufficient basicity to release the said peptide from the resin without causing decomposition of the said peptide, and
  (e) N-deblocking the first peptide to give an N-unprotected first peptide and then forming a second peptide by coupling in homogeneous solution in a neutral liquid phase the N-unprotected first peptide with an N-protected amino-acid or peptide having a carboxyl group which will react with the unprotected amino group of the N-unprotected peptide to form an amide link.

4. A process according to claim 3 in which the N-protecting group is tertiary butyloxycarbonyl.

5. A process according to claim 3, in which the cation exchange resin is a polysaccharide bearing carboxylic sulfonic or sulfuric acid groups.

6. A process according to claim 3 wherein in step (d) the peptide is eluted from the cation exchange resin using a solution of triethylamine in an aqueous organic solvent.

7. A process according to claim 3 wherein, after step (e), the second peptide is subjected to treatment in accordance with steps (b), (c) and (d).

8. A process for the production of a peptide having all protectable groups requiring protection protected, which comprises the steps of:
  (a) forming a first peptide by coupling in homogeneous solution in a neutral liquid phase which is substantially immiscible with aqueous citric acid solution, an N-unprotected amino-acid or peptide having a terminal carboxyl group protected as an ester group of formula —COOCH$_2$R$_1$ where R$_1$ represents a pyridyl, quinolyl or isoquinolyl radical, and an N-protected amino-acid or peptide having a carboxyl group which will react with the unprotected amino group of the N-unprotected amino-acid or peptide or form an amide link, (b) transferring the first peptide in the neutral liquid phase to an aqueous citric acid solution, (c) separating the aqueous citric acid solution containing the first peptide from the neutral liquid phase, (d) recovering the first peptide from the aqueous citric acid solution by treatment with a liquid in which the said peptide is stable and which has sufficient basicity to transfer the said peptide from the aqueous citric acid solution to said basic liquid in which the peptide is stable without causing decomposition of the said peptide, and (e) N-deblocking the first peptide to give an N-unprotected first peptide and then forming a second peptide by coupling in homogeneous solution in a neutral liquid phase which is substantially immiscible with aqueous citric acid solution, the N-unprotected first peptide with an N-protected amino-acid or peptide having a carboxyl group which will react with the unprotected amino group of the N-unprotected peptide to form an amide link.

9. A process according to claim 8 wherein the ester group is a 4-pyridylmethyl group.

10. A process according to claim 9 wherein the basic liquid used in step (d) is sodium bicarbonate solution.

11. A process according to claim 8 wherein the aqueous citric acid solution of step (b) is 2 N.

12. A process according to claim 8 wherein, after step (e), the second peptide is subjected to treatment in accordance with steps (b), (c) and (d).

References Cited
UNITED STATES PATENTS

| | | | |
|---|---|---|---|
| 3,076,797 | 2/1963 | Velluz et al. | 260—112.5 |
| 3,221,008 | 11/1965 | Wolf et al. | 260—210 |
| 3,247,181 | 4/1966 | Schwyzer et al. | 260—112.5 |
| 3,264,280 | 8/1966 | Hofmann et al. | 260—112.5 |
| 3,318,867 | 5/1967 | Jahnke | 260—210 |
| 3,388,112 | 6/1968 | Geiger et al. | 260—112.5 |

OTHER REFERENCES

Camble et al.: Nature, 217, 247–248 (1968).

Greben et al.: J. Genl. Chem. (U.S.S.R.) 38, 639–640 (1968).

Hermann: Peptides, Proceedings Eighth European Peptide Symposium, September 1966, North-Holland Publishing Company, Amsterdam, p. 196.

Meienhofer et al.: J. Am. Chem. Soc., 84, 2434–2436 (1962).

Nefkens et al.: Rec. Trav. Chim Pay-Bas, 82, 941–953 (1963).

LEWIS GOTTS, Primary Examiner

M. KASSENOFF, Assistant Examiner

U.S. Cl. X.R.

260—287 R, 294.8, 295, 309, 326.14, 326.3, 472, 481, 482